Sept. 26, 1950     A. J. GRANT     2,523,567
BABY CARRIAGE

Filed Dec. 30, 1948     2 Sheets-Sheet 1

A. J. Grant
INVENTOR

BY *CA Snow & Co.*
ATTORNEYS.

Sept. 26, 1950  A. J. GRANT  2,523,567
BABY CARRIAGE
Filed Dec. 30, 1948  2 Sheets-Sheet 2
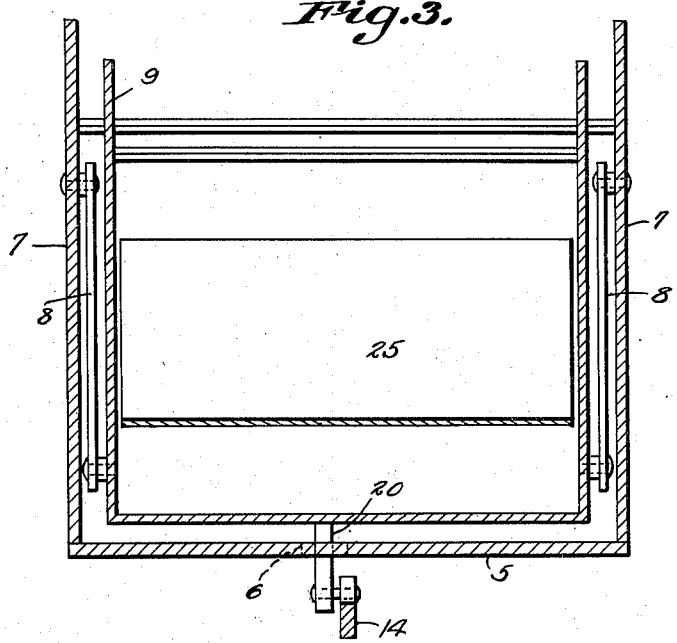
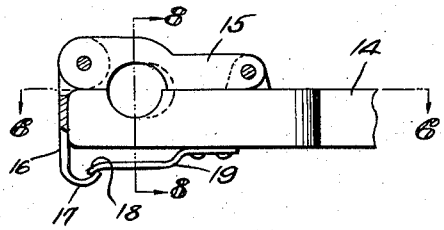
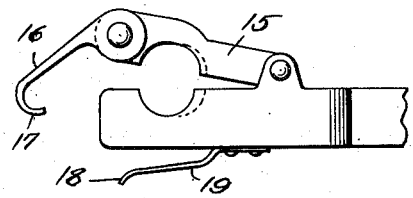
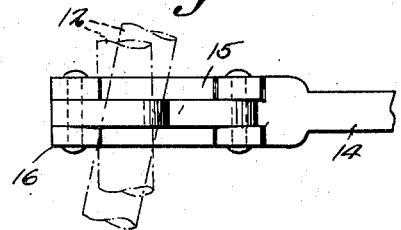
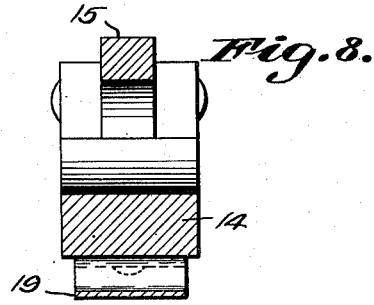
A. J. Grant
INVENTOR
BY C. A. Snow & Co.
ATTORNEYS.

UNITED STATES PATENT OFFICE 2,523,567

BABY CARRIAGE

Angus J. Grant, Findlay, Ohio

Application December 30, 1948, Serial No. 68,169

2 Claims. (Cl. 280—31)

This invention relates to baby carriages and baby buggies, the primary object of the invention being to provide a baby carriage or baby buggy having an inner auxiliary basket supported within the body of the carriage or buggy, together with means for swinging the auxiliary basket simulating the movement of a crib, as the carriage or buggy is being propelled along or on a supporting surface.

Another object of the invention is to provide a device of this character including an actuating arm having means to detachably connect it with the crank of the supporting axle of the carriage or buggy so that the auxiliary basket may be thrown into and out of operation at the will of the operator.

A further object of the invention is to provide a baby carriage or buggy having a swinging basket mounted within the body of the same, and a yieldable mattress supporting plate mounted within the basket to enhance the riding qualities of the vehicle.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Fig. 3 is a sectional view taken on the line 3—3 of Fig. 1.

Fig. 4 is an enlarged sectional view illustrating the clamp by means of which the operating arm is removably connected with the crank of the axle.

Fig. 5 is a plan view thereof.

Fig. 6 is a sectional view taken on line 6—6 of Fig. 4.

Fig. 7 is an enlarged elevational view illustrating the clamp used in connecting the operating arm with the crank of the axle, the clamp being shown in its open position.

Fig. 8 is a sectional view taken on line 8—8 of Fig. 4.

Figure 1:
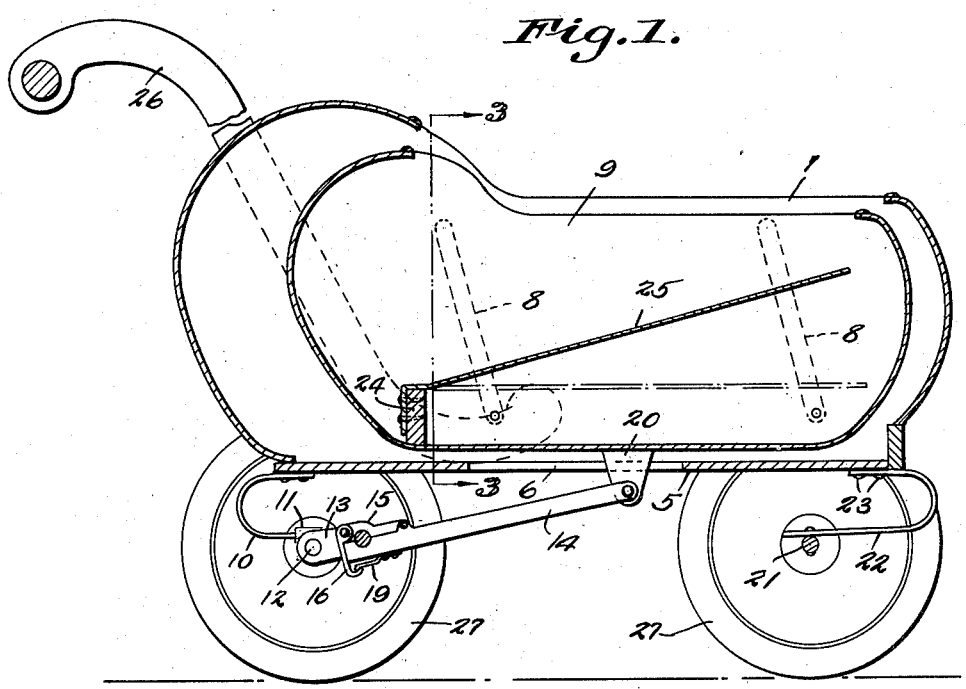
Figure 1 is a longitudinal sectional view through a baby carriage or buggy constructed in accordance with the invention.

Referring to the drawing in detail, the body portion of the baby carriage or buggy includes the bottom 5, which is formed with an elongated opening 6 formed therein at a point intermediate the side edges of the bottom and substantially centrally thereof.

The sides of the body are indicated by the reference character 7, and to which the swinging supporting arms 8 are pivotally connected, the arms having connection with the basket 9, at the front and rear ends thereof. These swinging supporting arms are mounted at opposite sides of the basket to properly support the basket.

Figure 2:
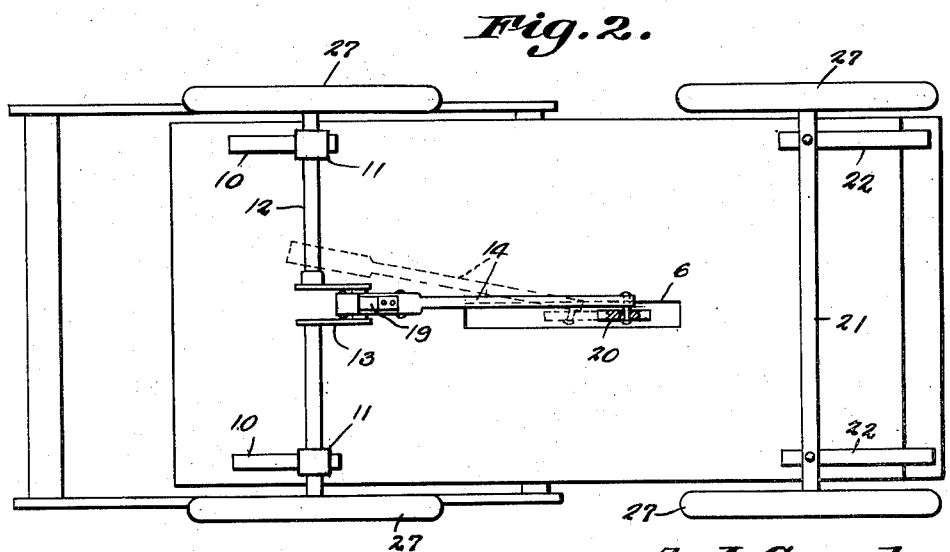
Fig. 2 is a bottom plan view thereof.

Secured to the bottom 5, are the springs 10 which have their lower ends connected with the bearings 11 in which the axle 12 operates, the axle 12 having a crank 13 disposed within its ends, to which one end of the operating arm 14 is removably connected. The reference character 15 indicates the clamp arm 6 pivotally connected to the operating arm 14, the clamp arm 15 having a semicircular cut out portion adapted to fit over the crank of the axle and cooperate with the cut-out portion formed in the upper surface of the operating arm 14 in clamping around the crank. The cut-out portions of the arm 15 and arm 14, taper towards one end thereof so that the operating arm 14 may be moved to an angular position as shown in dotted lines in Fig. 2 of the drawings, when it is desired to disconnect the operating arm from the crank 13 and connect it with the axle 12. Pivotally connected with the clamp arm 15, is the latch 16 which has an inwardly curved end 17 adapted to engage the downwardly curved end 18 of the spring 19 which is secured to the lower surface of the operating arm 14. Thus it will be seen that when it is desired to disconnect the operating arm from the shank 13, the latch 16 is moved to disengage the spring 19 allowing the clamp arm 15 to swing upwardly away from the crank 13. The operating arm 14 may now be moved to clamp the axle 12 at a point laterally of the crank 13.

Extending downwardly from the bottom of the basket 9, is the bracket 20, to which the forward end of the operating arm 14 is pivotally connected.

The front axle 21 of the carriage is connected with the springs 22 that in turn are connected with the bottom 5 by means of bolts 23.

Disposed within the basket 9 is a bar 24 that extends transversely of the basket, to which bar the spring plate 25 is connected at one end of the spring plate, the spring plate providing a support for a mattress, yieldably supporting the mattress for the comfort of the baby reclining thereon. The carriage is propelled by pushing the handles 26 of the carriage, which are secured to the carriage in the usual and well known manner.

Supporting wheels 27 are mounted on the axles, the rear wheels being secured to the rear axle to rotate the rear axle as the carriage is operated.

From the foregoing it will be seen that due to the construction shown and described, I have provided a baby carriage or buggy including an inner swinging basket having means for transmitting movement of a crank forming a part of the rear axle for swinging or rocking the basket simulating the movements of a crib, while the carriage is being rolled along over a supporting surface.

Having thus described the invention what is claimed is:

1. In a baby carriage, a body portion, a front axle and a rear axle including a main axle section, wheels mounted on the axles, the wheels at the rear of the carriage being secured to the rear axle to rotate therewith, a crank formed on the rear axle, a swinging basket mounted within the body portion, an operating arm having one of its ends pivotally connected to the basket, and a clamp removably clamping the opposite end of the operating arm to the main axle section holding the basket rigid or clamped to the crank whereby operation of the rear axle swings the basket within the body portion.

2. In a baby carriage, a body portion, front and rear supporting axles, wheels mounted on the axles, the wheels at the rear of the carriage being secured to the rear axle to rotate therewith, a crank formed on the rear axle, an operating arm, a basket mounted for swinging movement within the body portion, means for pivotally connecting the basket and operating arm, a pivoted clamp mounted on one end of the operating arm and adapted to clamp over the axle adjacent to the crank securing the basket against swinging movement, and a latch pivotally connected with the clamp and being movable over one end of the operating arm, said latch having a curved end, a spring secured to the lower edge of the operating arm and being engageable by the latch holding the latch in position on the rear axle or the crank, and said crank operating the arm swinging the basket as the carriage is moved over a supporting surface.

ANGUS J. GRANT.

REFERENCES CITED

The following references are of record in the file of this patent:

UNITED STATES PATENTS

| Number | Name | Date |
|---|---|---|
| 269,925 | Fairbanks | Jan. 2, 1883 |
| 626,106 | Stanley | May 30, 1899 |
| 956,331 | Fuessel | Apr. 26, 1910 |
| 1,336,725 | Biwoin | Apr. 13, 1920 |
| 1,349,509 | Herrick | Aug. 10, 1920 |
| 1,411,277 | Jacobs | Apr. 4, 1922 |
| 1,532,337 | O'Hearn | Apr. 7, 1925 |
| 1,784,875 | Jesswein | Dec. 16, 1930 |
| 2,107,855 | Drexler | Feb. 8, 1938 |